3,024,258
CONTINUOUS SULFONATION PROCESS
Richard J. Brooks and Burton Brooks, Seattle, Wash., assignors to The Chemithon Corporation, a corporation of Washington
Filed June 11, 1957, Ser. No. 665,069
21 Claims. (Cl. 260—400)

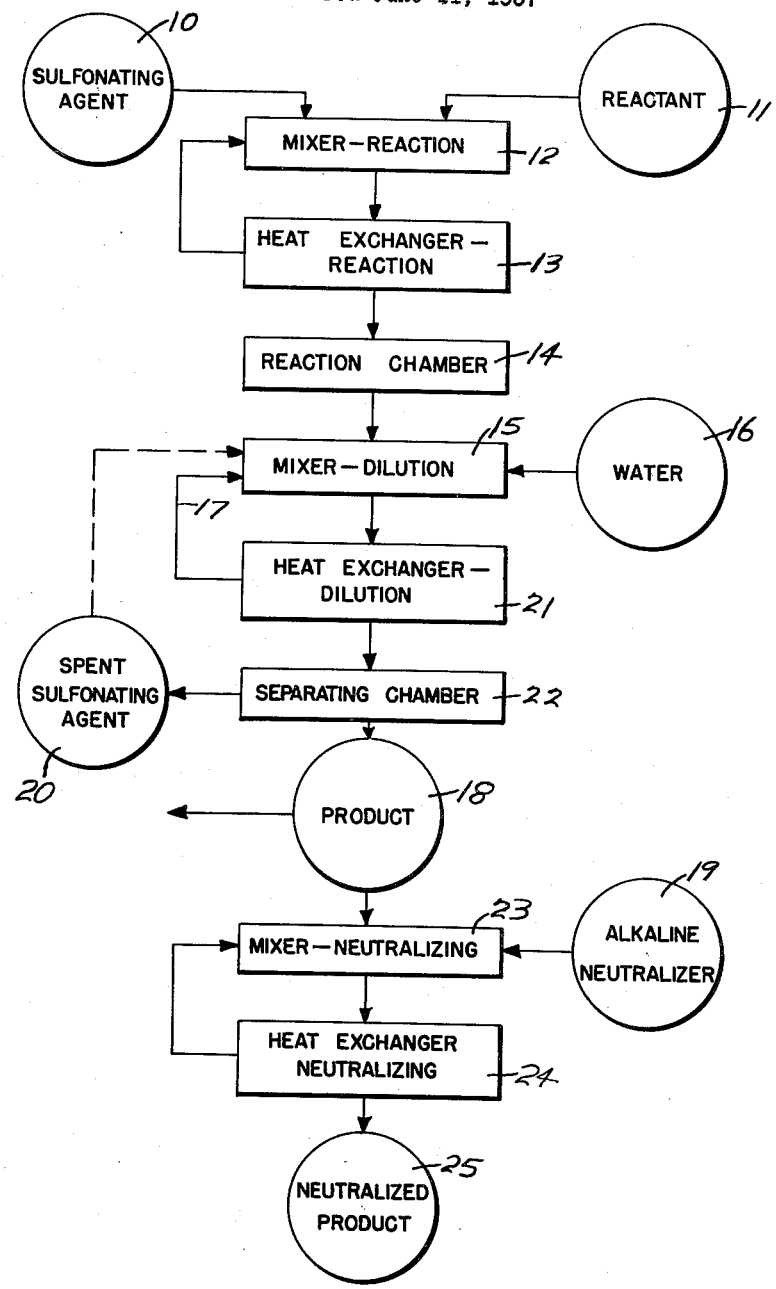

This invention relates to a process for sulfonating a reactant and, more particularly to a process for continuously and rapidly sulfonating a reactant with a sulfonation agent and for continuously and rapidly separating the resulting sulfonated reactant from the excess sulfonating agent, and for continuously neutralizing the resultant acids. In this specification and claims the term "sulfonating" (and related derivatives thereof such as sulfonate, sulfonation, sulfonic, sulfonated, and the like) is used sometimes in its generic sense as applying both to true sulfonating and to sulfating, and sometimes in its specific sense limited to true sulfonating. Where the context in which the term sulfonating or related derivative is used does not require the specific sense, it is to be construed generically.

This application is a continuation-in-part of our application, Serial No. 562,141, filed January 30, 1956, and now abandoned.

The preparation of organic sulfonic acids and of organic sulfonates for use as detergents having many of the desirable properties of soap by reacting organic compounds having an alcoholic hydroxyl, an olefinic linkage or an aromatic nucleus with sulfuric acid is well known in the art. The sulfonates as such find wide usage in the textile, leather, paper, glue, petroleum and other industries. Other examples illustrating the usage of the sulfonated derivatives are: the sulfonation product obtained from sulfonating a phenol-aldehyde condensation product is employed as an aid in leather treating; the alkali metal salts of sulfonated mineral oils are employed alone or in mixtures with fatty acid soaps as efficient surface active agents; certain sulfonation products obtained by sulfonating the higher molecular weight aromatic hydrocarbons and other compounds are employed in dyeing; and, certain sulfated esters such as esters of cetyl, stearyl, and palmityl alcohols, which are related to sulfonic acids, are employed as detergents.

Most of the commercial sulfonation methods are based on the batch process. To be more explicit, in a typical batch process for the sulfonation of a hydrocarbon such as an alkyl benzene having ten to fifteen carbon atoms in the alkyl chain the sulfonating agent, 22% fuming sulfuric acid, is added to the hydrocarbon over a period of two hours. The sulfuric acid is added to the hydrocarbon in such a manner that the reaction temperature does not exceed 100° F.; and the weight ratio of the acid to the hydrocarbon (based on the weight of the equivalent 100 percent $H_2SO_4$ per weight of hydrocarbon) is approximately 1.04. Next, the acid and hydrocarbon are agitated as by a circulating pump and the reaction permitted to take place for two additional hours. After the sulfonation step is completed sufficient water is added to the sulfonated hydrocarbon-sulfuric acid mixture to dilute the sulfuric acid to approximately 80% sulfuric acid in order to obtain more complete separation of the excess sulfuric acid from the sulfonated hydrocarbon. The temperature during the dilution step is limited to a maximum of 145° F. in order to minimize color degradation and also to limit the gel structure of the sulfonation mixture. After the dilution step is complete the aqueous sulfonation mix is left to settle into an upper layer comprising the sulfonated hydrocarbon and a lower layer comprising the excess sulfonating agent. This settling or separating of the acids takes a considerable period of time, viz., for a 2300 gallon batch approximately four hours settling is required to yield an 85/15 or better product (85 parts of the sodium salt of the sulfonated hydrocarbon and 15 parts of sodium sulfate, by weight). In order for the the process of sulfonating a hydrocarbon and separating the sulfonated hydrocarbon from the excess sulfonating agent to be carried to completion there is necessitated approximately eight hours of time. In those instances where the acid product is neutralized with an alkaline reagent the neutralization step necessitates approximately three to four hours. Therefore, the total time for the sequence of process steps, sulfonation, separation and neutralization there is required about eleven to twelve hours. Even though the batch sulfonation process is widely employed there are certain inherent limitations which restrict the usefulness of the process, i.e., in order for a batch sulfonation apparatus to have a reasonable output there is necessitated a large reaction vessel, a large settling or separating vessel, and a large neutralizing vessel. The large reaction vessel in turn requires a long addition time for the mixing of the sulfonating agent and the hydrocarbon, a long reaction time, and because of the large volume of the reactants the accompanying difficulty of controlling the temperature rise of the sulfonation mix. This temperature rise accompanied with the long reaction time leads to the degradation of the sulfonated hydrocarbon. The large volume of the aqueous separating mixture and the temperature rise, due to the hydration of the unreacted sulfonating agent, make it difficult to control the temperature of the aqueous mixture. Again, the long settling time accompanied with the temperature of the settling mixture is conducive to the degradation of the sulfonated product.

In the past there have been efforts to manufacture equipment of a more or less continuous nature by permitting the batch tanks to continuously overflow from one tank to another tank. This procedure does not increase the sulfonation or settling rates but only produces the product in a continuous manner. In other apparatus considerable use has been made of centrifugal pumps as mixing devices without decidely increasing the reaction rates or lowering the residence time in the apparatus. It is considered that the failure of prior mixing devices in relation to the sulfonation step is the premixing of the sulfonating agent and the reactant prior to their entry into the mixing device instead of the substantially simultaneous contacting and the mixing of the reactants in said device.

It should be noted that the prior art implies a large hold tank in the recycle system to bring about additional reaction time between the reactants. For example, see United States Letters Patent No. to Schmerling, 2,524,086, and Stoneman, 2,613,218. The dilution of newly introduced reactants with a large volume of almost completely reacted reactants reduces the reaction rate of the freshly introduced reactants. This is a result of a dilution in the concentration of the reactants. This decrease in the concentration of the reactants by the product of reaction increases the time required for sulfonation with resultant degradation of the final product.

In the above cited prior art and in order to separate the sulfonic acid product and the sulfate products from the excess sulfonating agent such as sulfuric acid, the mixture is added to sufficient water to decrease the strength of the sulfuric acid to about 80%. In this concentration and under these conditions the two phases, i.e., the product phase and the excess reactant phase, separate in about four hours. The reason for this slow separation is that the sulfuric acid phase is emulsified in the process in the product phase or the sulfonic acid phase. The viscosity of the sulfonic acid phase is very high. Naturally, with an emulsion of sulfuric acid in the sulfonic acid the viscosity will be quite high. Because of this high viscosity the separation of the emulsion into the product and the excess sulfonating agent requires a considerable period of time. Therefore, any conditions that tend to decrease the viscosity also hasten or are conducive to the rate of separation of the excess sulfonating agent and the product. Such conditions are higher temperatures with the corresponding decrease in the viscosity and the use of more dilute acids so as to decrease the viscosity. However, such techniques as the use of higher temperatures and the use of more dilute acids increase the corrosion rates of the material on stainless steel. Coupled with this is the fact that even under these circumstances the separating time is not materially reduced below four hours. As a modification upon this it has been noticed that there is some improvement in the four hour separating time by the introduction of the diluted mixed acids below the interface in the settling tank. The washing action of the sulfuric acid layer on the mixed acids improved the separating rate. It will be demonstrated by this invention that the most effective method for separating the sulfonic acid product from the excess sulfonating agent is to invert the emulsion of the sulfuric acid in the continuous sulfonic acid phase so that there results an emulsion comprising as the continuous phase sulfuric acid with the sulfonic acid dispersed therein. This latter emulsion is less viscous than the former emulsion. Because of this decrease in viscosity and resulting greater mobility the two separate into the sulfonic acid product phase and the sulfuric acid phase in a matter of minutes instead of hours.

With these limitations and shortcomings of the batch sulfonation process in view and the large and bulky apparatus required to carry out the process, we have invented a continuous sulfonation process which necessitates relatively small and compact apparatus, is rapid and continuous in the sulfonation step, and is rapid and continuous in the separation of the sulfonate from the excess sulfonating agent. Briefly, in order to carry out the reaction step we substantially and instantaneously contact and mix a reactant and a sulfonating agent to form a reaction solution in a system of small volume. And we may also continuously mix the reaction solution with a partially separated aqueous reaction solution, i.e., a solution having excess sulfonating solution in it and which has been separated from the sulfonate. Another manner of considering this is that there is formed an inverted emulsion in which the excess sulfonation agent such as sulfuric acid forms a continuous phase with the sulfonate product dispersed therein. After mixing the reaction solution and the partially separated aqueous reaction mixture we continuously flow the resulting partially separated aqueous reaction solution through a separating vessel wherein the latter mixture rapidly separates into the spent sulfonating agent and the product. In the instance wherein the product is neutralized with an alkaline material the product and a slurry of the alkaline material are thoroughly mixed together to give a neutralized product.

Briefly, the discovery is that if the two normally immiscible reactants are simultaneously and instantaneously introduced and thoroughly mixed in a system of small volume, the reaction rate is very rapid, and often true solutions are formed when careful attention is paid to the concentration of the sulfonating agent. This permits the sulfonation reaction to take place in a matter of minutes instead of hours. Secondly, the separation of the excess sulfonating agent from the sulfonic acid product is very rapid if there is formed an emulsion comprising as the continuous phase the sulfuric acid and having the more viscous sulfonic acid dispersed therein. The method of bringing about this inversion will be more fully presented herein. Employing our technique, separation may be made in a few minutes in place of hours. The result is a process which can be operated continuously, producing superior products over those now known and which can be carried out in equipment smaller and considerably less expensive than any shown by the prior art.

An object of this invention is the provision of a rapid continuous sulfonation process, the rapid and continuous separation of the sulfonate from the excess sulfonating agent, and for continuously neutralizing the resulting acid product.

A further object is to provide a process for making a high active sulfonate detergent having favorable color characteristics, said high-active sulfonate comprising about ninety percent active material on the dry basis.

Another object is to provide a continuous sulfonation process possessing a short reaction time between the sulfonating agent and the reactant to produce a substantially complete reaction.

A further object is the provision of a sulfonation process readily amenable to the control of the reaction temperatures, reaction time, settling temperatures, and settling time.

A still additional and important object is the provision, on a product volume output, of a low cost sulfonation process.

Another object is to provide a sulfonation process requiring approximately the theoretical amount of caustic to neutralize the resulting sulfonic acid as the separation of the sulfonic acid from the sulfonating agent in the reaction solution is substantially the theoretically obtainable value.

Various other and ancillary objects and advantages of the instant invention will become apparent from the following description and explanation of the present invention.

In the accompanying drawing:

FIGURE 1 is a schematic flow sheet of the process illustrating the steps for contacting the sulfonating agent and the material undergoing sulfonation, the reaction chamber, the apparatus for separating from each other the excess sulfonating agent and the sulfonic acid, and the neutralization of the product with a base.

An overall picture of our sulfonation process as illustrated by our flow sheet for the making of a neutralized sulfonated and/or sulfated organic compound reveals that we continuously contact a sulfonating agent 10, a reactant 11, and a reaction solution resulting from the reaction of the sulfonating agent and the reactant in a reaction mixer 12 to form the reaction solution. This technique of simultaneously introducing and mixing the reactants in a system of small volume forms the basis for improved results over conventional sulfonation processes. This reaction solution passes to a heat exchanger 13 and from the heat exchanger the mixture is split into two fractions, a first fraction which is recirculated through the reaction mixer 12 along with the sulfonating agent and the reactant, and a second fraction which passes through a reaction chamber 14 wherein the sulfonating agent substantially sulfonates the reactant. The reaction solution, upon leaving the reaction chamber, passes to a dilution mixer 15 where it is thoroughly mixed with water 16 and a partially separated aqueous reaction mixture 17. This partially separated aqueous reaction mixture contains nuclei or large discrete droplets (discontinuous phase) of a first component 18 comprising the product of the reactant undergoing sulfonation and a continuous phase of a second component 20 comprising the excess sulfonating agent. Upon leaving the dilution mixer, the partially separated aqueous reaction mixture flows to a heat exchanger 21 from whence it splits into two fractions, the first fraction 17 which is recirculated along with the water 16 and the reaction solution and a second fraction which passes through the separating chamber 22. In the separating chamber the partially separated aqueous reaction mixture rapidly and continuously separates into the first component or sulfonic acid and excess sulfonating agent. The sulfonic acid may be isolated at this point and the product utilized or the sulfonic acid transferred to a neutralizing mixer 23 where it is mixed with an alkaline neutralizer 19 to form a neutralized product 25. This neutralized product passes through a heat exchanger 24 where the thermally regulated neutralized product splits into two fractions, a first fraction which is recirculated through the neutralizing mixer along with fresh sulfonic acid and additional alkaline neutralizer and a second fraction which is the neutralized product. In most cases the entire operation of sulfonation, dilution, settling and neutralization may be completed in a time period of about one-half hour. From this the advantage of the increased rate of operation of this process is readily apparent when it is considered that in previously used batch processes there was required eleven to twelve hours to accomplish the same operations.

The product of the reaction between the sulfonating agent and the reactant is the hydrogen sulfonate of the reactant when it is an organic compound having an aromatic nucleus and/or the hydrogen sulfate of the reactant when it is an organic compound having an alcoholic hydroxyl or an olefinic linkage. Likewise, the neutralized product is the salt of the sulfonate of the reactant and/or the salt of the sulfate of the reactant.

In the sulfonation process there are a number of critical points which must be closely regulated in order to secure a high-quality sulfonic acid which is not carbonized and degraded. To be more explicit, these steps are in the mixing of the sulfonating agent and the reactant; the ratio of the diluent or recycled solution to the reactants in the reaction system; the method of separating the product and the sulfonating agent from each other; the time of the sulfonation reaction; the type of sulfonating agent; the ratio of the sulfonating agent to the reactant; the temperature of the reaction solution; and, the time required for the product to separate from the excess sulfonating agent. Said high-quality product has less than about one percent unreacted reactant on the one hundred percent active basis.

Suitable sulfonating agents for use in the sulfonation and/or sulfation processes are fuming sulfuric acid, and concentrated sulfuric acid. Of the many fuming sulfuric acids available, the 22% fuming sulfuric acid gives good results. Concentrated sulfuric acid, such as 100% or 98% sulfuric acid, is frequently employed as the sulfonating agent, especially where the reaction cannot be too vigorous.

In carrying out our continuous sulfonation process one of the main steps is the simultaneous contacting and thorough mixing of the sulfonating agent and the material undergoing sulfonation in a system of small volume and the removal of the heat of reaction. Under these conditions many of the sulfonatable materials form clear, light-colored solutions, the reaction solution. The mixing should be so vigorous as to be practically instantaneous in order to achieve the best results. Exemplary of the liquid reaction solutions formed is the one comprising an alkyl benzene having from eight to eighteen carbon atoms in the side chain and 22% fuming sulfuric acid. Although the alkyl benzene is a white liquid the resulting transparent reaction solution possesses a color varying from light amber to cherry red and is stable upon standing a week at room temperature. This clear reaction solution is to be contrasted with the dark brown mixture formed by the batch and other continuous processes. This dark brown mixture separates into two layers when agitation is stopped. We believe that the difference lies in the simultaneous contacting and substantially instantaneous mixing of the reactants in a system of small volume so as to thoroughly contact the reactants with recycled reaction solution. Another reaction solution comprises a mixture of the methyl esters of oleic acid, palmitic acid, and stearic acid and 98% sulfuric acid. The esters themselves are initially dark in color and are not transparent, and the reaction solution is also dark in color and is not transparent. As is readily appreciated the formation of the reaction solution from the reactants and recycled reaction solution eliminates local over-heating and excessive localized acid concentrations thereby making a more uniform and better quality product. To be more explicit, in the sulfonation of an alkyl benzene and in the absence of local overheating and too high an acid concentration there is less possibility of product degradation.

The temperature of the reaction and the time of the reaction are closely interrelated as generally the higher the temperature the shorter the reaction time. One of the ways of regulating the temperature of the reaction solution is to recycle some of the reaction solution after it has passed through the reaction heat exchanger. This recycled reaction solution flows through the reaction mixer along with the sulfonating agent and the reactant, and functions as a heat sink or an absorber of the heat of reaction. Generally speaking, the rate of recycling the reaction solution should be a minimum of 15 times the rate of feed (15:1). A distinction should be made at this point between the rate of recycle, and the quantity of material recycled. The recycle rate should be high, but the system volume small. In actual practice this ratio is greater than 15 to 1 so as to assure a heat sink for the heat of reaction and thereby prevent overheating and burning of the product. Normally, the temperatures of the reactants are of secondary importance although for ease of handling their temperatures should be sufficiently high to insure that they will be in the fluid state. Consistent with this objective, the lower the temperature of the feed streams, the smaller the heat exchanger required to maintain the temperature at the desired level in the system, and hence the smaller the volume of the sulfonation system. For example, in the sulfonation of an alkyl benzene with 22% fuming sulfuric acid the alkyl benzene should be in the liquid state and the temperature of the sulfuric acid should be in the range slightly above the freezing point of the acid up to room temperature. As a variation on this process it is to be realized that the reactants may be cooled or even refrigerated. For example, if the alkyl benzene is refrigerated, and the sulfonating agent refrigerated, it is possible to materially reduce the size of the reaction heat exchanger 13. Immediately upon forming the reaction solution the temperature of the solution is adjusted to a value in the range of 85–140° F. by extracting some of the heat of reaction. The reactants are then permitted to react for a sufficiently long period of time to insure a substantially 100% conversion of the material undergoing sulfonation to a sulfonic acid and/or a sulfate. This period of time is normally from four to ten minutes at the indicated temperatures for the alkyl benzene. By so regulating the reaction temperature and the time of reaction it is possible to produce a better quality product as there is less possibility of harmful side reactions taking place with resulting product degradation. Another important factor in the sulfonation reaction is the concentration of the sulfonating agent. The higher the concentration of the sulfonating agent the shorter the reaction time required to accomplish complete conversion.

One of the main advances of our process is the high velocity rate of a relatively small volume of the reaction solution. As contrasted with the small volume of the reaction solution in the reaction or sulfonation mixer 12, and the heat exchanger 13, we have found that in the subsequent neutralization step, that the volume of the recycle stream is less important as long as a high recycle rate is maintained, being limited only by the size of the equipment employed for carrying out the process.

Another very important step in the sulfonation process is the treating of the reaction solution with water so as to prepare an aqueous reaction solution which separates rapidly into the product and the excess sulfonating agent. The diluted reaction solution normally forms an emulsion having as a continuous phase the sulfonic acid product and dispersed therein the excess sulfonating agent. This emulsion is viscous and, upon standing, slowly separates into the sulfonic acid product and into the excess sulfonating agent. It may take as long as ten to twelve hours for the mixture to separate into the product and the excess sulfonating agent. For this reason it has been necessary in prior processes, be they batch or continuous, to have a large separating tank so that there is sufficient time for the separation step.

The addition of water, within certain well-defined ranges, and the agitation thereof, to form an inverted emulsion, considerably alters the separation time of the product and the excess sulfonating agent. More particularly, if the volume of the excess sulfonating agent is at least about 22% by volume of less than 86% strength sulfuric acid and the resultant mixture agitated properly, there is formed an inverted emulsion. This inverted emulsion comprises a continuous phase of the excess sulfonating agent and has dispersed therein droplets of the product. The inverted emulsion, in comparison with the emulsion comprising the product as the continuous phase with excess sulfonating agent dispersed therein, is not very viscous. Therefore, this inverted emulsion rapidly separates into the product and the excess sulfonating agent. In fact, the separation is so rapid that the inverted emulsion can be continuously flowed into a tank or chamber and the separation is substantially complete in a period of from eight to fifteen minutes.

There may be considered to be four main methods for initiating and maintaining rapid separation of the reaction solution. One of these comprises the mixing of the reaction solution with water in the dilution mixer to form an aqueous reaction solution. A substantial sample of the aqueous reaction solution is withdrawn from the system and allowed to stand without agitation for a period of ten to fifteen minutes. Upon standing, the emulsion begins to separate into larger drops of the product and the excess sulfonating agent. This mixture of the product and the sulfonating agent is then re-introduced into the dilution recirculation mixer along with the water and the reaction solution. As long as the volume of the excess sulfonating agent, expressed as less than 86% strength sulfuric acid, is maintained at a minimum of about 22% by volume in the dilution mixture, there is formed the inverted emulsion with sulfuric acid as the continuous phase.

In the second method for inducing rapid separation of the product and the excess sulfonating agent, with the system full of the reaction solution and water which have been mixed in the dilution mixer, the plant is shut down for approximately a period of ten to fifteen minutes. The emulsion begins to separate into the product and the excess sulfonating agent. Upon starting the plant and recirculating the partially separated mixture, and as long as the minimum volume of the excess sulfonating agent, expressed as less than 86% strength sulfuric acid, in the dilution mixture, is maintained at least 22% by volume, there is formed the inverted emulsion.

A third method for initiating and maintaining the rapid separation of the excess sulfonating agent and the product is to recycle some of the spent sulfonating agent, which has been previously separated from the product, into the dilution mixer 15 along with the water and reaction solution. A sufficient quantity of the spent sulfonating agent should be recycled so as to build-up the concentration of the same to at least a minimum value of 35% by volume expressed as less than 86% strength sulfuric acid in the dilution mixer to initiate the inversion to the continuous sulfuric acid phase, and once inversion has been accomplished, maintained at a minimum of about 22% by volume. This minimum concentration insures that once the step of inverting the emulsion has started this inversion will continue.

A fourth method for inducing and maintaining the separation of the product and the excess sulfonating agent is to insure a sufficiently high ratio of sulfonating agent to alkyl aryl reactant so as to form an emulsion comprising the excess sulfonating agent as the continuous phase and the product as the discontinuous phase. More particularly, initiating of the inversion step can be brought about if the minimum volume of the excess sulfonating agent expressed as less than 86% strength sulfuric acid is at least 35% by volume. And, the maintaining of the inverted emulsion can be realized if the excess sulfonating agent in the dilution step is at least 22% by volume, expressed as less than 86% strength sulfuric acid.

From this it is seen that to initiate the formation of the inverted emulsion comprising the excess sulfonating agent as the continuous phase and the product as the discontinuous phase without using the shutdown procedure that the volume of the excess sulfonating agent be at least 35% by volume expressed as less than 86% strength sulfuric acid. Furthermore, once the formation of the inverted emulsion has been initiated it is necessary to maintain the volume of the excess sulfonating agent at a value of at least about 22% by volume expressed as less than 86% strength sulfuric acid. If the concentration of the excess sulfonating agent falls below about 22% by volume the emulsion remains as one having a continuous phase of the product and a discontinuous phase of the excess sulfonating agent. In regard to the concentration of the sulfuric acid it has been noted that a desirable range is 75–86% by strength. The minimum value of 75% strength is arrived at from the fact that a weak acid is so corrosive on the materials that it is not economically feasible to use the same. However, if materials are used that can withstand the weaker acid then it will be feasible to use an acid of a strength less than 75%. Above 86% acid strength, the separation is incomplete.

The dilution of the excess sulfonating agent with the water lessens the reaction rate but with the consequent release of a considerable quantity of heat, the heat of dilution. Even though the sulfonating agent is reduced in concentration and effectiveness, nevertheless at an elevated temperature it is still capable of adversely acting upon the sulfonic acid. Therefore, the heat of dilution in the aqueous reaction solution is removed and the temperature adjusted to a value in the range of 115–140° F. by flowing the same through a heat exchanger. In this temperature range, complete separation of the two phases can be realized.

The separating time or the time required to achieve substantially maximum separation of the first component from the second component is normally from 8 to 15 minutes. Again, it is appreciated that the maintaining of the partially separated aqueous reaction mixture within a temperature range of 115–140° F. and the restricted separating time is conducive to the production of a uniform and high quality product as there is less possibility, due to the low temperature and short residence time, of undesirable degradation occurring. In fact, it can be shown that in the short time required to complete separation of the two phases that there is an improvement of product color due to the differential loss of color bodies in the spent acid layer. However, sufficiently high temperatures must be maintained to assure rapid separation. Thus, as the temperature drops appreciably below 115° F. the components become more viscous, and the settling times as a result become longer. Within the temperature range specified settling rates are very high, and no need is seen for using temperature much above 140° F. where excessive temperature will cause undue degradation of the sulfonic acid and excessive corrosion of the settling chamber.

In regard to the separation of the sulfonic acid product from the excess sulfonation agent we find it to be essential that the system through the separating mixer be free of gas such as air. More explicitly, there should be provision for maintaining a positive pressure on the reaction mixer, viz., the reactant, the sulfonation agent, and the reaction solution, and for maintaining a positive pressure on the dilution mixer, i.e., the water, the reaction solution, and the partially separated aqueous reaction mixture. This positive pressure can be maintained by placing a valve on the discharge line and throttling the same until a positive pressure is maintained on the entire system. Also before starting up the sulfonation and/or sulfation equipment the air entrapped therein should be expelled. We have found that the separation of the product from the excess sulfonating agent requires considerably less time when the gas is excluded from the reaction solution and from the partially separated aqueous reaction mixture than when the gas is not so excluded. The outstanding improvement in settling rates obtained with this invention over previously employed processes and apparatus can be attributed to the exclusion of gas such as air in the closed system and the washing action of the partially separated and rapidly recirculating stream bringing about the phase inversion. Open agitation tanks employed prior to our invention permit air to be mixed into the acid solution. Also, the mixing system of these open agitation tanks is insufficient to allow the small drops of each phase to agglomerate in order to form the continuous sulfuric acid phase.

In the manufacture of a detergent from the sulfonic acid the separated first component is mixed with a 14–20% sodium hydroxide solution. Because of the heat developed upon neutralizing the product with the base it is preferable to extract a large amount of this heat. With this desideratum in view, the neutralized product in slurry form is recycled through a heat exchanger to maintain the temperature in the range of 85–140° F. This recycled neutralized product functions as a heat sink or an absorber of some of the heat of reaction. A satisfactory apparatus employs a centrifugal pump to contact the sulfonate and/or the sulfate and the alkaline slurry, e.g., one having a nine inch impeller and a 75 gallon per minute capacity with a 75 foot head. The speed of operation of this pump in the neutralization step is of secondary importance as long as the pump mixes the product and the alkaline slurry, and we have found a desirable speed to be 1750 r.p.m. This pump should be so made as to admit the product, the alkaline slurry, and the neutralized product resulting from the product reacting with the alkaline slurry. This neutralized sulfonate slurry, pH of about 10–10.5, is then further treated to make the detergent product. In the making of a detergent we flow the neutralized product into a crutching tank where the pH is adjusted to about 7.

In our process for the sulfonation step it is desirable to have intimate mixing of both the sulfonating agent and the reactant undergoing sulfonation and, often, a solution comprising the sulfonating agent and the reactant is formed. Therefore, it is essential that the reaction mixer be of such a type that it substantially simultaneously contacts and mixes the reactants in a system of small volume.

There should also be provision for removing the heat of reaction. Also, of importance is the use of sufficient excess sulfonating agent so as to maintain the strength of the excess agent in the reaction mixer equivalent to at least 94% sulfuric acid. Generally speaking we employ a mol ratio of 2.8–3.5 to 1 of sulfuric acid to reactant. The sulfonating agent is expressed as sulfuric acid. By so doing, it is normally possible to obtain clear reaction solutions when using alkyl benzenes with 8–18 carbon atoms in the side chain. However, as the mol ratio of the sulfonating agent to the other reactants drops and the spent acid becomes more dilute the extra water causes the two phases to separate so as to form a turbid reaction mixture. There are a number of mixers capable of making a reaction solution. One of these mixers is a centrifugal pump. We have found that a single-stage pump having a nine inch impeller and a 75 gallon per minute capacity with a 75 foot head is satisfactory. Leading into this pump are two concentric pipes so that one of the pipes introduces the sulfonating agent and the other pipe introduces the reactant inside of the pump. These pipes terminate a fraction-of-an-inch from the impeller and in this manner the sulfonating agent and the reactant are separately introduced into the pump and also are substantially simultaneously and instantaneously contacted and mixed into the reaction solution. In this mixing step it is necessary to operate the pump in excess of 900 r.p.m. to insure adequate mixing. Another mixer is the colloid mill which is especially designed to make solutions, emulsions, colloids and dispersions out of solids and liquids. In introducing the reactants into the mill the same should be introduced separately so that there is no possibility of premixing with consequent overheating and degradation of the product. A third type of mixer is a transducer which employs sonic waves to bring about rapid mixing of the sulfonating agent and the reactant undergoing sulfonation. Again, in introducing the reactants to the transducer no premixing of the same should take place in order to prevent undesirable side reaction. Yet another way of mixing is to simultaneously inject each reactant into the turbulent zone of an orifice mixer which produces a high velocity in the recirculating stream. However, it should again be emphasized that the volumes of the various mixing systems must be kept to a minimum.

A number of heat-exchangers are utilized in the carrying out of the process. These heat-exchangers may be of a standard type, and the particular type we employ is a reverse flow type of heat-exchanger, with small tubes, to obtain maximum efficiency with a minimum of volume.

The reaction chamber on the discharge side of the sulfonation mixing system may take a number of different forms. The reaction chamber should assure a slow passage of the reaction solution and therefore sufficient time for almost complete sulfonation to take place. A desirable form of reaction chamber is a pipe of a small diameter and relatively long. For example, the pipe may be three inches in inside diameter and sixteen feet in length. In particular, the pipe may be of sections four feet in length which fold back on each other. As previously stated the reaction time in our process is normally from four to ten minutes. The main feature of the reaction chamber should be that it be long and relatively small in diameter so as to eliminate the possibility of channelling or back mixing of the reaction solution. Any appreciable amount of channelling will decrease the period of time in which the reaction can take place in the system and thereby lessen the degree of sulfonation, and back mixing adversely affects the reaction rate.

The dilution mixer must possess the characteristics of being able to thoroughly mix the reaction solution with water and the partially separated and inverted aqueous reaction emulsion to form a separating mixture. The mixer most appropriate for this step is a centrifugal pump. To be more specific we employ a single-stage centrifugal pump having a nine inch impeller and a 75 gallon per minute capacity with a 75 foot head as our separating or dilution mixer. In order to secure the best separation with the centrifugal pump we have found that the same should not be operated at excessively high speeds, but must provide good recirculation or recycling rates. With this operating limitation in view we have achieved with this centrifugal pump the best separation at 900 r.p.m., very good separation at 1200 r.p.m., and good separation at 1750 r.p.m. Sufficient water should be added in the operation to dilute the excess sulfuric acid to 78 to 82%. As the amount of water is increased, the settling rate also increases. However, the acid also becomes more corrosive below this range, so that dilution beyond this point is undesirable. In this range of concentrations the acid separates very rapidly.

The partially separated and inverted aqueous reaction mixture is permitted to separate into the first component comprising the product, and into the second component comprising the excess sulfonating agent by flowing the mixture slowly through a separating vessel. The flow rate is such that the residence time in the vessel is from about eight to fifteen minutes. The particular separating vessel which we employ is a vertical cylindrical chamber having an inlet aperture approximately midway between the ends. At the upper end there is an outlet opening for the product and in the bottom there is another outlet opening for the spent sulfonating agent, generally about 80% sulfuric acid. In the separating vessel the aqueous mixture separates into the two components with the lighter product floating on the heavier spent sulfonating agent. Normally, the interface is maintained a slight distance above the inlet point. The level of the interface between these two components is maintained within a close range by an interface controller comprising a float, an interface regulator, and a valve in the sulfonating agent outlet line.

The sulfonation process is a combination of individual operations functioning as a unit. As corrosive chemicals are being handled, it is of primary importance that the materials of construction be able to withstand the action of these chemicals and three appropriate materials are 316 stainless steel, alloy 20, and glass. Of these we prefer the alloy 20 and the 316 stainless steel as they are not so prone to breakage and damage as the glass. In regard to corrosion, the sulfonating agent is diluted with water to form about 80% sulfuric acid. Such an acid is not as corrosive acting on the apparatus as a weaker acid and yet separates from the product.

Having presented a general picture of our sulfonation process and the apparatus for carrying out the same we will now present six specific examples but it is to be understood that these examples are by way of illustration only and are not to be taken as limitations on the process.

EXAMPLE I

In this particular instance we sulfonated a hydrocarbon comprising in the main alkyl aryl hydrocarbon, more particularly, alkyl benzene with the alkyl group having twelve to fifteen carbon atoms. A typical analysis of this alkyl aryl hydrocarbon is:

| | |
|---|---|
| Gravity, API (ASTM D 287) | 29.5–31.0 |
| Viscosity at 100° F. SU (ASTM D 88) | 44–50. |
| Color, Saybolt (ASTM D 156) | +19 minimum. |
| Bromine number (SM–15–13) | 0.5 maximum. |
| Aniline point, ° F. (ASTM D 611) | 46–56. |
| Sediment and water (ASTM D 96) | Nil. |
| Appearance | Bright and clear at 70° F. |
| Distillation, ° F. (ASTM D 447): | |
| 5% recovered | 530–535. |
| 95% recovered | 560–565° F. |
| Doctor Test (FS–5203) | Negative. |

*Additional Typical Tests*

| | |
|---|---|
| Molecular weight | Approx. 246 |
| Specific gravity 60/60 | 0.877 |
| Flash point (Pensky Martin) ° F | 255–260 |
| ASTM distillation (D 447), ° F.: | |
| Start | 512 |
| 5 | 533 |
| 10 | 535 |
| 30 | 540 |
| 50 | 545 |
| 70 | 551 |
| 90 | 558 |
| 95 | 563 |
| End Point | 570 |

We introduce 3.5 lbs./min. of this alkyl benzene and 4.2 lbs./min. of 22% fuming sulfuric acid into the first centrifugal pump to make a reaction solution of the same. The reactants are injected through concentric pipes into the suction side of the pump which is operating at a speed of 1750 r.p.m. The temperature of the reactants is room temperature, and at this temperature both of the reactants are liquids. In addition to introducing the sulfuric acid and the hydrocarbon into the pump we simultaneously recycle a partially reacted solution into the pump in order to remove the heat of reaction.

The reaction solution, upon leaving the pump, passes the first heat exchanger where the temperature of the solution is regulated to a value in the range of 120° F.

Upon being cooled to the desired temperature, the reaction solution is split into two fractions, a first fraction which is recirculated through the first centrifugal pump along with the reactants in a manner previously explained, and the second fraction which passes through the reaction chamber. In the recycling step the rate of flow of the recycled reaction solution compared to the volume of the entering reactants was approximately 15–1. The residence or digestion time of the solution in the reaction chamber is from four to ten minutes, and the time in the mixing circuit should not exceed three minutes.

The reaction solution, upon leaving the reaction chamber, is substantially reacted and the reaction is stopped by mixing the solution with about 0.77 lb./min. of water. The solution and water are mixed by introducing the same into the second centrifugal pump of the same capacity as the first centrifugal pump. The ratio of water to the hydrocarbon reactant is about 0.22 pound of water per pound of hydrocarbon, and the pump speed is in the range of 1400–1750 r.p.m. Rapid separation is initiated, as soon as this second system is full, by stopping the entire apparatus for approximately ten minutes so as to permit small drops of each phase to form, or the same result can be accomplished by recycling for a few minutes some 75–86% sulfuric acid from the bottom of the settling tank into the dilution mixture. The partially separated aqueous reaction mixture, consisting of an emulsion in which the sulfuric acid forms the continuous phase, with droplets of sulfonic acid therein is passed through the second heat exchanger to regulate the temperature of the same to a value of approximately 120° F., and upon leaving the heat exchanger the aqueous mixture is split into a first fraction and into a second fraction. The first fraction is recirculated through the second centrifugal mixing pump along with the fresh reaction solution and the water. In this regard the ratio of the recycled mixture to the water and the fresh reaction solution may vary over a wide range as long as there is sufficient quantity to remove the heat of dilution and to insure the thorough washing of the solution to form droplets of each phase. In this particular instance the rate of flow of the recycled sulfuric acid layer compared to the volume of fresh reaction solution was approximately 15–1. The second fraction runs into the separating chamber wherein it separates into sulfonic and sulfuric acid layers. The residence time in the separating chamber is about ten minutes. The second component comprises substantially entirely 80% sulfuric acid, and the first component comprises approximately 88–90% sulfonic acid with the balance water and sulfuric acid.

The first sulfonic acid component is next mixed in the third centrifugal pump of the same capacity as the first and second pumps with a 14.5 percent sodium hydroxide solution to make a slurry having a pH in the range of 10–10.5. For this mixing operation the pump is operated at a speed of 1750 r.p.m. The slurry is passed through a heat exchanger to regulate the temperature to a value of approximately 110° F. Upon leaving the heat exchanger, the slurry is split into a first fraction which is recirculated through the pump along with the caustic solution and fresh sulfonic acid and into a second fraction which is further treated to give a detergent having a pH of about 7.

The resulting detergent is of the following approximate composition.

| Component: | Percent by weight |
|---|---|
| Sodium alkyl aryl sulfonate | 40 |
| Unreacted alkyl benzene | 0.2 |
| Sodium sulfate | 5.0 |
| Water | 54.8 |
| | 100.0 |
| Color (Tristimulus) | 3–4 |

The sulfonation reaction is so nearly a 100% reaction that there is only a minimum of unreacted hydrocarbon in the detergent. As is well-known, one of the main uses of a detergent is in the role of a cleaning agent.

EXAMPLE II

This example employs the same apparatus and utilizes the same alkyl benzene as in Example I. However, in this instance 3.5 lbs./min. of the alkyl benzene and 3.5 lbs./min. of 20% fuming sulfuric acid are fed through concentric pipes and discharged directly into the suction side of the first centrifugal pump operating at about 1750 r.p.m. to form the reaction solution. This solution circulates through the first heat exchanger where the temperature of the same is regulated to a value of about 120° F. Upon leaving the heat exchanger the reaction solution splits into the first fraction which recirculates through the first centrifugal pump along with the sulfonating agent and the reactant, and a second fraction which flows to the reaction chamber. In this instance the rate of flow of the recycled reaction solution compared to the volume of fresh reactants was approximately 20–1. The average residence time in the first pump and the heat exchanger is approximately three minutes.

The second fraction flows through the reaction chamber in about 15 minutes, and in this time period the sulfonation is practically completed. The longer reaction time is required because of the lower acid concentration employed. Upon leaving the reaction chamber the reaction solution flows to the second centrifugal pump operating in the range of 1400–1750 r.p.m. where it is mixed with 0.66 pound per minute of water, the partially separated aqueous reaction mixture, and 1.5 lbs./min. of spent 75–86% sulfuric acid from the bottom of the settling tank to form a rapidly separating mixture. The spent sulfuric acid is recirculated to insure that the emulsion remains inverted so as to have a continuous sulfuric acid phase with sulfonic acid dispersed therein. This latter solution mixture flows through the second heat exchanger where its temperature is held at about 130° F. After leaving the second heat exchanger the partially separated aqueous reaction mixture splits into the first fraction which is circulated through the second centrifugal pump along with the fresh reaction solution and the water, and the second fraction which flows into the separating chamber where it separates in approximately fifteen minutes and at about 120° F. into 78% sulfuric acid and the product.

The product upon exiting from the separating chamber proceeds to the third centrifugal pump operating at about 1750 r.p.m. where it is mixed with 7.0 lbs./min. of 14.5% sodium hydroxide solution. This partially neutralized product or slurry is passed through the third heat exchanger and the temperature adjusted to about 100° F. The slurry at this stage is of pH 10.5–11.0 and is discharged into a crutching tank where the pH is adjusted to 7.5–8.0.

The resulting detergent is of the following approximate composition:

| Component: | Percent by weight |
|---|---|
| Sodium alkyl aryl sulfonate | 40 |
| Unreacted alkyl benzene | 0.3 |
| Sodium sulfate | 5 |
| Water | 54.7 |
| | 100.0 |
| Color (Tristimulus) | 2–4 |

Again, this detergent is useful as a cleaning agent.

EXAMPLE III

As an example of a sulfation reaction in which digestion, dilution, and settling are not employed, a mixture of the methyl esters of oleic acid, palmitic acid, and stearic acid are sulfated in the same apparatus as employed for the sulfonation of the alkyl benzene in Example No. I. This mixture comprises, by weight, approximately one-half oleic acid and the other one-half being palmitic and stearic acids. Of these three esters only the methyl oleate is unsaturated and therefore in this step only the methyl ester of oleic acid is sulfated.

In carrying out this sulfation 4.0 lbs./min. of the ester mixture and 1.4 lbs./min. of 98% sulfuric acid are introduced into the first centrifugal pump and transformed into a reaction solution. Again, the ester and the acid are introduced through concentric pipes into the pump so as not to have premixing of the reactants. Both the acid and the ester mixture are at room temperature and therefore are liquids so as to be readily introduced into the pump. The pump is operated at a speed of 1750 r.p.m. thereby insuring the formation of the reaction solution.

The reaction solution is passed through the heat exchanger to regulate the temperature of the solution to a value in the range of 90–130° F. and preferably 120° F. Upon leaving the heat exchanger, the solution is split into a first stream and a second stream. The first stream is recycled through the first centrifugal pump along with the mixture of esters and the sulfuric acid and thereby again formed into the reaction solution. Because the reaction is reversible the second stream flows directly to the second centrifugal pump operating at 1750 r.p.m. where it is mixed with about 6 lbs./min. of a 16% solution of sodium hydroxide. The product has a pH of 3–5, and contains approximately 7.3% sulfur trioxide combined with methyl oleate, 18% water, and the balance the methyl esters of palmitic and stearic acids. These sulfated oils are employed as anti-foaming agents.

EXAMPLE IV

This example employs both the sulfonation and sulfation apparatus of Example III. In carrying the reaction 1.6 lbs./min. of xylene and 3.8 lbs./min. of 22% fuming sulfuric acid are introduced into the first centrifugal pump and transformed into a reaction solution. The xylene and the acid are introduced through concentric pipes into the pump so as not to have premixing of the reactants. Both the acid and the xylene are at room temperature and therefore are liquids so as to be readily introduced into the pump. The pump is operated at a speed of 1750 r.p.m. thereby insuring the formation of the reaction solution, in this instance a clear solution.

The reaction solution is passed through the first heat exchanger to adjust the temperature of the solution to a value in the range of 90–130° F. and preferably 120° F. Upon leaving the heat exchanger the solution is split into a first stream and a second stream. The first stream is recycled through the first centrifugal pump along with the xylene and the sulfuric acid and thereby again formed into the reaction solution. The second stream flows directly to the neutralization pump where it is mixed with 6 lbs./min. of a 16% solution of sodium hydroxide.

EXAMPLE V

The alkyl benzene employed in Example I was used in this example. We introduced 3.5 lbs./min. of this alkyl benzene and 4.9 lbs./min. of 22% fuming sulfuric acid into the first centrifugal pump to make a reaction solution of the same. The reactants were injected through concentric pipes into the suction side of the pump which was operating at a speed of 1750 r.p.m. In addition to introducing the sulfuric acid and the hydrocarbon into the pump we simultaneously recycled a partially reacted solution into the pump in order to remove the heat of reaction produced by the reactants.

The reaction solution, upon leaving the pump, passed through the first heat exchanger where the temperature of the solution was regulated to a value in the range of 120° F.

Upon being cooled to the desired temperature, the reaction solution was split into two fractions, a first fraction which was recirculated through the first centrifugal pump along with the reactants in a manner previously explained, and the second fraction which passed through the reaction chamber. The residence time of the solution in the reaction chamber was five minutes, and the time in the mixing circuit did not exceed three minutes.

The reaction solution, upon leaving the reaction chamber, was substantially reacted and the reaction was stopped by mixing the solution with about 0.80 lb./min. of water. The solution and water were mixed by introducing the same into the second centrifugal pump of the same capacity as the first centrifugal pump. The pump speed was in the range of 1400–1750 r.p.m. Using this ratio of reactants, wherein there were about 3.5 pounds of alkyl benzene and 4.9 pounds of fuming sulfuric acid phase inversion took place automatically. As the phase inversion was once initiated it continued because of the high concentration of the sulfuric acid present in the mixture.

The balance of the process proceeded as in Example I, and the resulting detergent was of the following approximate composition.

| Component: | Percent by weight |
|---|---|
| Sodium alkyl aryl sulfonate | 40 |
| Unreacted alkyl benzene | 0.15 |
| Sodium sulfate | 5 |
| Water | 54.8 |
| | 100.0 |

Color (Tristimulus) _____ 5–7

EXAMPLE VI

We introduced 3.0 lbs./min. of pentadecyl benzene having an average of 15 carbon atoms in the side chain and 3.6 lbs./min. of 22% fuming sulfuric acid into the first centrifugal pump to make a reaction solution of the same. The reactants were injected through concentric pipes into the suction side of the pump which was operating at a speed of 1750 r.p.m. The temperature of the reactants was room temperature, and at this temperature both of the reactants were liquids. In addition to introducing the sulfuric acid and the hydrocarbon into the pump we simultaneously recycled a partially reacted solution into the pump in order to remove the heat of reaction.

The reaction solution, upon leaving the pump, passed the first heat exchanger where the temperature of the solution was regulated to a value in the range of 120° F.

Upon being cooled to the desired temperature, the reaction solution was split into two fractions, a first fraction which was recirculated through the first centrifugal pump along with the reactants in a manner previously explained, and the second fraction which passed through the reaction chamber. In this instance the rate of flow of the recycled reaction solution compared to the volume of fresh reactants entering the system was about 20–1. The residence time of the solution in the reaction chamber was seven minutes, and the time in the mixing circuit did not exceed three minutes.

The reaction solution, upon leaving the reaction chamber, was substantially reacted and the reaction was stopped by mixing the solution with about 0.66 lb./min. of water. The solution and water were mixed by introducing the same into the second centrifugal pump of the same capacity as the first centrifugal pump. The ratio of water to the hydrocarbon reactant was about 0.22 pound of water per pound of hydrocarbon, and the pump speed was in the range of 1400–1750 r.p.m. Rapid separation was initiated, as soon as this second system was full, by stopping the entire apparatus for approximately ten minutes so as to permit small drops of each phase to form. As the phase inversion was once initiated it continued because of the high concentration of the sulfuric acid present in the mixture. The partially separated aqueous reaction mixture, consisting of an emulsion in which the sulfuric acid formed the continuous phase, with droplets of sulfonic acid therein, was passed through the second heat exchanger to regulate the temperature of the same to a value of approximately 120° F., and upon leaving the heat exchanger the mixture was split into a first fraction and into a second fraction. The first fraction was recirculated through the centrifugal mixing pump along with fresh reaction solution and the water. In this regard the ratio of the recycled mixture to the water and the fresh reaction solution varied over a wide range as long as there was a sufficient quantity to remove the heat of dilution and to insure the thorough washing of the solution. The second fraction flowed into the separating chamber wherein it separated into sulfonic and sulfuric acid layers. The residence time in the separating chamber was about ten minutes. The second component comprised substantially entirely 80% sulfuric acid, and the first component comprised approximately 88–90% sulfonic acid with the balance water and sulfuric acid.

The first sulfonic acid component was next mixed in the third centrifugal pump with a 14.5 percent sodium hydroxide solution as in Example I.

The resulting detergent was of the following composition:

| Component: | Percent by weight |
|---|---|
| Sodium alkyl aryl sulfonate | 40 |
| Unreacted alkyl benzene | 0.5 |
| Sodium sulfate | 6 |
| Water | 53.6 |
| | 100.0 |

Color (Tristimulus) _____ 5–7

The sulfonation reaction was so nearly at 100% reaction that there was only a minimum of unreacted hydrocarbon in the detergent. As is well-known, one of the main uses of a detergent is in the role of a cleaning agent.

The advantage of the invention, it is thought, will have been clearly understood from the foregoing detailed description. Minor changes will suggest themselves and may be resorted to without departing from the spirit of the invention, wherefore it is our intention that no limitations be implied and that the hereto annexed claims be given a scope fully commensurate with the broadest interpretation to which the employed language admits.

Wherein we claim:

1. A continuous process for sulfonating an organic reactant, selected from the class consisting of compounds having an alcoholic hydroxyl, compounds having an olefinic linkage and compounds having an aromatic nucleus, with an acid selected from the group consisting of concentrated sulfuric acid and fuming sulfuric acid which comprises thoroughly mixing said organic reactant and said acid with a preformed reaction mixture thereof by simultaneously and continuously introducing a stream of said reactant, a stream of said acid and a stream of said preformed mixture, without premixing said streams, into a zone of vigorous mixing whereby rapid reaction between the said reactant and the acid is effected and a reaction mixture is formed, continuously withdrawing the reaction mixture from said zone as a stream, splitting the reaction mixture in said withdrawn stream into an output stream and a recycle stream, returning said recycle stream as said preformed reaction mixture to said zone of vigorous mixing where it is mixed with incoming reactant and acid, and cooling at least the recycle portion of the withdrawn reaction mixture before returning the recycle stream to the zone of vigorous mixing.

2. The process as set forth in claim 1 in which the average residence time of the reaction mixture in the mixing circuit is at most about 3 minutes.

3. A process for sulfonating an alkyl benzene having from 8-18 carbon atoms in the alkyl group which comprises introducing said alkyl benzene and a sulfonating agent, selected from the group consisting of concentrated sulfuric acid and fuming sulfuric acid, into a recycle stream of reaction mixture of said alkyl benzene and sulfonating agent with vigorous and thorough admixing, the residence time in said recycle stream not substantially exceeding 3 minutes, the rate of recycling the reaction mixture to the rate of feed of alkyl benzene and sulfonating agent being a minimum of 15 times the rate of feed of alkyl benzene and sulfonating agent, withdrawing an output stream of reaction mixture from said recycle stream, and subjecting the reaction mixture of said output stream to digestion for a period of time not substantially exceeding about 15 minutes whereby the alkyl benzene is substantially completely reacted.

4. A process which comprises continuously introducing alkyl benzene and a sulfonating agent, selected from the group consisting of concentrated sulfuric acid and fuming sulfuric acid, with vigorous and thorough mixing into a recycling stream of partially reacted mixture of said alkyl benzene and sulfonating agent, continuously withdrawing a stream of partially reacted mixture from said recycling stream after a residence time in said recycling stream not substantially exceeding three minutes, and subjecting the partially reacted mixture in said withdrawn stream to digestion for a period of time not substantially exceeding 15 minutes to effect substantially complete reaction of the alkyl benzene.

5. A process which comprises reacting an alkyl benzene having from 8 to 18 carbon atoms in the alkyl group with sufficient sulfonating agent, selected from the group consisting of concentrated sulfuric acid and fuming sulfuric acid, to form a sulfonation reaction mixture containing excess sulfuric acid while preventing substantial entrainment of extraneous gas, diluting said sulfonation reaction mixture with a sufficient quantity of an aqueous medium to form an emulsion which is rapidly separable by gravity, said emulsion having as the continuous phase at least 22% by volume of sulfuric acid of about 75% to 86% concentration and as the discontinuous phase alkyl benzene sulfonic acid, and separating the phases.

6. A continuous process for sulfating an organic reactant, selected from the class consisting of compounds having an alcoholic hydroxyl and compounds having an olefinic linkage with an acid selected from the group consisting of concentrated sulfuric acid and fuming sulfuric acid in the presence of preformed sulfation reaction mixture which comprises simultaneously and continuously introducing a stream of said organic reactant and a stream of said acid, without premixing, into a zone of vigorous mixing in a recycle stream of said preformed mixture in a recycle circuit consisting of said zone of vigorous mixing interconnected with a cooling zone, continuously withdrawing an output stream of the reaction mixture from said recycle circuit and directly neutralizing the reaction mixture in said output stream.

7. A continuous process for sulfonating alkyl aryl hydrocarbon with a sulfonating agent selected from the group consisting of concentrated sulfuric acid and fuming sulfuric acid which comprises thoroughly mixing said alkyl aryl hydrocarbon and sulfonating agent with a preformed reaction mixture thereof by simultaneously and continuously introducing a stream of said alkyl aryl hydrocarbon, a stream of said sulfonating agent and a stream of said preformed mixture, without premixing said streams, into a zone of vigorous mixing whereby rapid reaction between the said alkyl aryl hydrocarbon and the sulfonating agent is effected and a reaction mixture is formed, continuously withdrawing the reaction mixture from said zone as a stream, splitting the reaction mixture in said withdrawn stream into an output stream and a recycle stream, said recycle stream being at least 15 times as large by volume as said output stream, returning said recycle stream as said preformed reaction mixture to said zone of vigorous mixing where it is mixed with incoming alkyl aryl hydrocarbon and sulfonating agent, cooling at least the recycle portion of the withdrawn reaction mixture before returning the recycle stream to the zone of vigorous mixing, and digesting the mixture constituting said output stream.

8. A continuous process for sulfonating alkyl benzene with a sulfonating agent selected from the group consisting of concentrated sulfuric acid and fuming sulfuric acid which comprises thoroughly mixing said alkyl benzene and sulfonating agent with a preformed reaction mixture thereof by simultaneously and continuously introducing a stream of said alkyl benzene, a stream of said sulfonating agent and a stream of said preformed mixture, without premixing said streams, into a zone of vigorous mixing whereby rapid reaction between the said alkyl benzene and the sulfonating agent is effected and a reaction mixture is formed, continuously withdrawing the reaction mixture from said zone as a stream, splitting the reaction mixture in said withdrawn stream into an output stream and a recycle stream, said recycle stream being at least 15 times as large by volume as said output stream, returning said recycle stream as said preformed reaction mixture to said zone of vigorous mixing where it is mixed with incoming alkyl benzene and sulfonating agent, cooling at least the recycle portion of the withdrawn reaction mixture before returning the recycle stream to the zone of vigorous mixing, and digesting the mixture constituting said output stream.

9. A continuous process for rapidly sulfonating an alkyl aryl hydrocarbon which comprises continuously reacting an alkyl aryl hydrocarbon having 8–18 carbon atoms in the alkyl group with a sulfonating agent selected from the group consisting of concentrated sulfuric acid and fuming sulfuric acid by vigorously mixing said hydrocarbon with a stoichiometric excess of said sulfonating agent in the presence of recirculated previously formed sulfonation reaction mixture and thereby form a sulfonation reaction mixture, the rate at which said previously formed sulfonation reaction mixture is recirculated being at least 15 times the rate at which said hydrocarbon and sulfonating agent are introduced, splitting the thus produced sulfonation reaction mixture into a portion to be recirculated and a portion to be digested, recirculating said portion to be recirculated, digesting said portion to be digested for a period of time sufficient to assure substantially complete sulfonation of said hydrocarbon by said sulfonating agent, adding water to said substantially completely sulfonated hydrocarbon and excess sulfonating agent and forming a rapidly settling emulsion in which diluted excess sulfonating agent is the continuous phase and sulfonated hydrocarbon is the discontinuous phase, allowing the emulsion to separate into an upper layer comprising the sulfonated hydrocarbon and a lower layer comprising the diluted excess sulfonating agent, and recovering said sulfonated hydrocarbon.

10. The process as set forth in claim 9 in which the temperature of the recirculated sulfonation reaction mixture is within the range of 85–140° F. and the temperature of the rapidly settling emulsion is within the range of 115–140° F.

11. The process as set forth in claim 9 in which the process is carried out, at least through the step of adding water to the sulfonated hydrocarbon and excess sulfonating agent, in the absence of extraneous gas.

12. The process as set forth in claim 9 in which the portion of the sulfonation reaction mixture to be digested is digested for a period of time of the order of 4 to 15 minutes.

13. The process as set forth in claim 9 wherein the continuous phase of said rapidly separating emulsion comprises at least 22% by volume of less than 86% strength sulfuric acid.

14. The process as set forth in claim 9 in which the alkyl aryl hydrocarbon is a mono alkyl benzene, the sulfonating agent is fuming sulfuric acid, and the mol ratio of fuming sulfuric acid to hydrocarbon is from 2.8:1 to 3.5:1, expressing the sulfonating agent as 100% sulfuric acid.

15. The process of claim 14 in which the rapidly settling emulsion is initiated by providing therein at least 35% by volume of diluted excess sulfonating agent of less than 86% strength sulfuric acid.

16. The process of claim 15 in which the rapidly settling emulsion is maintained by providing at least 22% by volume of said diluted excess sulfonating agent.

17. The process as set forth in claim 15 in which diluted excess sulfonating agent from said lower layer is recycled and commingled with the diluted substantially completely sulfonated hydrocarbon and excess sulfonating agent in a proportion sufficient to establish the concentration of diluted excess sulfonating agent in the mixture at at least 22% by volume.

18. The process as set forth in claim 14 in which the rapid separation is induced by forming a quiescent mixture of substantially completely sulfonated hydrocarbon and at least 22% by volume of diluted sulfonated agent of less than about 86% strength sulfuric acid, maintaining such mixture in a quiescent state for a period of time sufficient to permit formation of large drops rich in dilute sulfonating agent, and commingling said drop-containing mixture with freshly diluted substantially completely sulfonated hydrocarbon and excess sulfonating agent.

19. The process as set forth in claim 9 in which said recovered sulfonated hydrocarbon is neutralized to form an alkyl aryl sulfonate salt.

20. A process which comprises reacting an alkyl benzene having from 8 to 18 carbon atoms in the alkyl group with a stoichiometric excess of sulfuric acid under conditions which prevent entrainment of extraneous gas to form a sulfonation reaction mixture, diluting said sulfonation reaction mixture with a sufficient quantity of an aqueous medium to form an emulsion having as the continuous phase at least about 22% by volume of diluted excess sulfuric acid of less than 86% concentration and as the discontinuous phase alkyl benzene sulfonic acid, and separating the phases.

21. A process which comprises reacting an alkyl benzene having from 8 to 18 carbon atoms in the alkyl group with a stoichiometric excess of sulfuric acid under conditions which prevent entrainment of extraneous gas to form a sulfonation reaction mixture, continuously mixing a stream of said sulfonation reaction mixture with sufficient aqueous medium in the presence of a recycle stream of previously diluted sulfonation reaction mixture to form an emulsion having alkyl benzene sulfonic acid dispersed as the discontinuous phase in a continuous phase of at least 22% by volume of dilute sulfuric acid of less than 86% strength, removing a stream of said emulsion from said recycle stream and introducing it into a settling zone wherein the alkyl benzene sulfonic acid phase rises to form an upper layer leaving a lower layer of the dilute sulfuric acid phase, removing a stream of the alkyl benzene sulfonic acid from said upper layer and removing a stream of diluted sulfuric acid from said lower layer.

References Cited in the file of this patent

UNITED STATES PATENTS

| | | |
|---|---|---|
| 2,524,086 | Schmerling | Oct. 3, 1950 |
| 2,613,218 | Stoneman | Oct. 7, 1952 |
| 2,676,185 | Melstrom et al. | Apr. 20, 1954 |
| 2,723,990 | Gilbert et al. | Nov. 15, 1955 |
| 2,733,264 | Wohlers et al. | Jan. 31, 1956 |
| 2,766,275 | Connelly et al. | Oct. 9, 1956 |